Aug. 11, 1964  G. W. FULLER ETAL  3,144,153
CLOSURE FOR A VESSEL
Filed Nov. 27, 1962
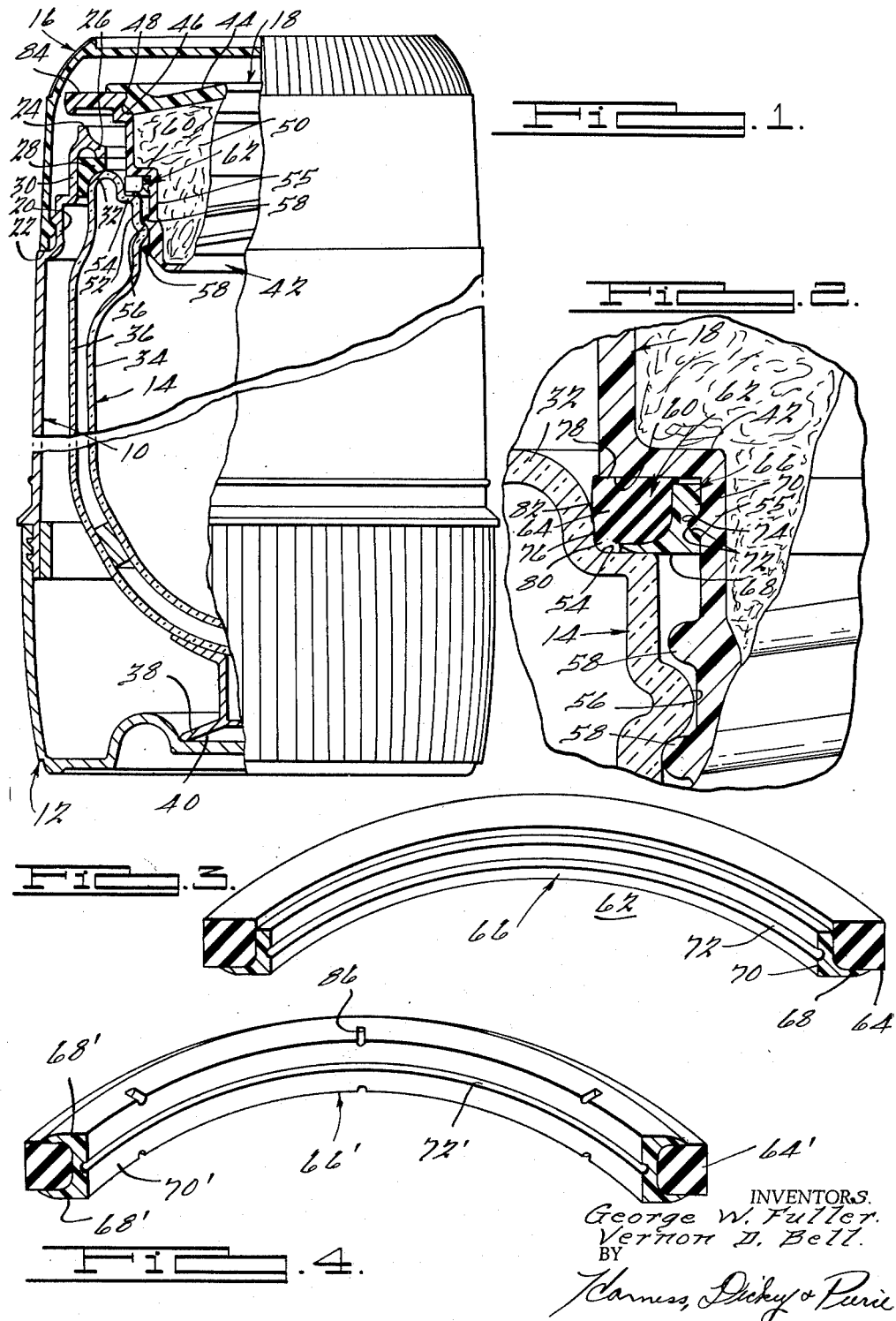
INVENTORS.
George W. Fuller.
Vernon D. Bell.
BY
Harness, Dickey & Pierce
ATTORNEYS.

United States Patent Office 3,144,153
Patented Aug. 11, 1964

3,144,153
CLOSURE FOR A VESSEL
George W. Fuller, Hampton, Conn., and Vernon D. Bell, Westerly, R.I., assignors to King-Seeley Thermos Co., Ann Arbor, Mich., a corporation of Michigan
Filed Nov. 27, 1962, Ser. No. 240,231
23 Claims. (Cl. 215—13)

This invention relates to a combination vacuum bottle and removable closure means therefor and more particularly to such a combination comprising a threaded stopper and an improved composite seal interposed between the stopper and the bottle.

Vacuum bottle assemblies usually comprise a cylindrical casing, a hollow filler enclosed in the casing, a removable stopper closing the open end of the hollow filler, and a removable cup-like cover element. The filler is usually fabricated of glass and is of double-wall construction in which the space between the walls is silvered and evacuated to minimize heat transfer through the walls of the filler and maintain the contents of the bottle at a substantially constant temperature. The filler usually has a neck, which may define either a relatively wide or relatively narrow mouth for the filler and receives the removable stopper. In the preferred and herein illustrated embodiment of the invention the neck and stopper have mating screw-threads and the improved composite seal of the present invention is interposed between a seat adjacent the open end of the neck and a seat carried by the stopper.

When a stopper is put into place in a filler containing a hot liquid, a pressure in excess of atmospheric pressure develops in the filler as a consequence of the rise in temperature of the air in the filler. This pressure tends to eject the stopper. In the case of a threaded stopper it tends to unscrew the stopper. On the other hand, as the contents gradually cool, the air pressure gradually drops and a partial vacuum develops within the filler. This partial vacuum tends to draw the stopper into the neck and interfere with desirably free removal of the stopper. The composite seal of the present invention assures the retention in place of the stopper under the high pressure conditions as well as its ready removability under the low pressure conditions.

More particularly, the seal of this invention is a composite structure comprising a gasket or ring of quite highly resilient rubber or the like and a sealing ring or casing formed of low-friction material such as polyethylene, polypropylene or the like. The sealing ring partially surrounds the rubber gasket or ring, and is interposed between a portion of the rubber gasket and the seat on the filler neck, so that both the gasket and the sealing ring engage the seat when the stopper is screwed into place.

The highly resilient gasket has adequate flexibility to follow irregularities commonly present in the seat in the filler neck due to normal manufacturing tolerances applicable to glass blown articles. Thus the gasket forms an effective seal between the stopper and the neck and prevents leakage therebetween under both high pressure and partial vacuum conditions.

Additionally, under high pressure conditions, the frictional bond between the composite seal and the neck prevents unscrewing of the stopper. The coefficient of friction between the gasket and the neck is considerably higher than that between the sealing ring and neck and consequently the just mentioned frictional bond is in major part supplied by the gasket.

On the other hand, the sealing ring engages the filler seat at a point intermediate the interior of the filler and the points at which the gasket engages the filler seat. Thus, under partial vacuum conditions the sealing ring positively prevents the gasket from being deformed and sucked in part off the seat and into the annular space between the neck and the stopper. Thus, the only substantial frictional bond that must be overcome when it is desired to unscrew the stopper under partial vacuum conditions is the bond between the gasket and the seat. This bond, while sufficient to prevent unintended pressure-induced unscrewing under high pressure conditions is not large enough to interfere with desired removal of the stopper.

A further advantage of the sealing ring, interposed as it is between the gasket and the interior of the filler, is that it prevents contact between the gasket and the contents of the filler.

With the foregoing as well as other considerations in view, principal objects of the present invention are to provide a combination vacuum bottle and closure means embodying a composite seal interposed between the bottle and the closure characterized as preventing unintended ejection of the stopper under conditions when the bottle contents are hot and the air pressure within the bottle is above atmospheric pressure and as permitting easy removal of the stopper when the contents have cooled and the air pressure within the bottle is sub-atmospheric; to provide such a structure in which the stopper has a threaded connection with the bottle and the composite seal is interposed between spaced seats on the stopper and within the neck of the bottle; and to provide such structures in which the seal comprises a highly resilient gasket element formed of rubber or the like and a casing of flexible low-friction material which partially encloses the gasket.

With the above as well as other and more detailed objects in view, two preferred but illustrative embodiments of the invention are shown in the accompanying drawing, in which:

FIGURE 1 is a fragmentary view, partly in section and partly in elevation, of a vacuum bottle embodying the present invention, and showing the stopper preliminarily seated in the filler neck;

FIG. 2 is an enlarged fragmentary view of the structure in FIGURE 1, and showing the stopper fully seated in the filler neck;

FIG. 3 is a fragmentary view, in perspective, of the seal of FIGURES 1 and 2; and FIG. 4 is a fragmentary view, in perspective, of a modified form of seal.

Referring to FIGURE 1, the illustrated vacuum bottle comprises a usual casing 10, lower enclosure 12, a filler 14, a removable cover 16 and a stopper 18. Casing 10, cover 16 and lower enclosure 12 may be formed of any suitable material selected, for example, from the commonly used moldable thermosetting or thermoplastic materials. The interior of the skirt of cover 16 and the exterior of the reduced upper cylindrical portion 20 of casing 10 are provided with mating threads so that the cover can be readily threaded into place and removed from the casing. In fully seated position on the casing the lower edge of the skirt of cover 16 rests upon an annular shoulder 22 on casing 10. Similarly, the interior of the skirt of the lower enclosure 12 and the exterior of the lower end portion of the casing are provided with mating threads, enabling the enclosure 12 to be readily threaded into place or removed from the casing.

Above the reduced portion 20, the casing material is molded so as to define an upwardly presenting annular pouring lip 24 and a downwardly presenting annular shoulder 26. A neck-rubber 28 is seated between the shoulder 26, the reduced cylindrical portion 30 of casing 10 and the rounded annular surface 32 provided at the extreme upper end of the filler 14.

Except in the respects hereinafter noted, filler 14 is of usual double-wall glass construction having spaced walls 34 and 36, the space between which is silvered and evacuated. At its lower end, filler 14 is provided with a seating element 38 which preferably has some degree of resilience, and which rests in a cup-shaped depression 40 formed in the base of the lower enclosure 12. It will be appreciated that in assembling the bottle, filler 14 is projected into the casing 10 from the lower end of the latter and that when the lower enclosure 12 is threaded into place it bears against the element 38 and presses the upper end of the filler 14 firmly into engagement with the neck-rubber 28, thus securing casing 10, filler 14 and lower enclosure 12 in properly assembled relation to each other.

Except in the respects hereinafter noted, the stopper 18 may be variously constructed. As shown, the stopper 18 comprises a generally upwardly presenting cup-like cylindrical body portion 42 and a cover 44 both of which may be and preferably are formed of any of the usual moldable thermosetting or thermoplastic materials. The upper portion of the wall of the cup-like body portion 42 is formed to define an annular seat 46 and a shoulder 48, the wall surface between seat 46 and shoulder 48 being somewhat undercut. The cover 44 is formed to snap into place past the shoulder 48 and into seating relation to the seat 46 and has a peripheral configuration which is complemental to that of the body portion in the region of seat 46 and shoulder 48. Preferably and as shown the stopper 18 is filled with insulating material 50 to improve its heat insulating properties of the stopper and minimize heat transfer therethrough.

Coming now to the structural features to which the present invention is particularly directed, the upper portions of the interior wall 34 of the filler 14 define an annular generally smooth neck 52 and a generally horizontally disposed annular shoulder or seat 54. As shown, the seat 54 is located somewhat below the previously mentioned rounded upper end 32 of the filler. The lower portion 55 of the outer wall of the stopper body is cylindrical and somewhat smaller in diameter than the neck portion 52 of the filler 14. The neck 52 and wall portion 55 are formed with mating threads 56 and 58 so as to provide a screw threaded connection between the stopper 18 and the filler 14.

Above the wall portion 55 the stopper is provided with a generally horizontally extending seat 60 and the improved composite seal 62 of the present invention is positioned between the stopper and filler seats 60 and 54.

As previously indicated, the seal 62 comprises an annular ring or gasket 64 of relatively soft highly resilient rubber or rubber-like material and a substantially L-shaped annular sealing ring or casing 66 of relatively flexible material having a low coefficient of friction, for instance, such as polyethylene, polypropylene, or the like. The sealing ring or casing 66 partially surrounds the gasket 64 and is provided with a horizontal portion 88 constituting the base of the L and a portion 70 constituting the vertical leg of the L. As shown, the vertical leg 70 is provided with an annular groove 72 which in the assembled position of the parts receives an annular bead 74 provided on the outer surface of the wall portion 55. Though relatively non-resilient the sealing ring 66 is sufficiently resilient to enable it to be snapped over the bead 74 and it will be understood that the mating relation between the bead 74 and the groove 72 holds the composite seal in place upon the wall portion 55 and prevents displacement of the sealing ring under the influence of sub-atmospheric conditions in filler 14 or upon removal of the stopper 18 under sub-atmospheric conditions.

The groove 72 and bead 74 are so positioned that when the bead enters the groove the upper surface of gasket 64 is firmly pressed against seat 60. This firm pressure, supplemented to a minor degree by engagement between wall 55 and leg 70, establishes a frictional bond between the seal and the stopper which causes the seal to rotate with the stopper when the latter is threaded into place as well as when it is unscrewed from the filler. This bond also prevents leakage between the seal and the stopper.

The horizontal leg 68 of the sealing ring 66 rests upon the filler seat 54 but terminates short of the adjacent annular vertical wall portion 76 of the filler. In consequence, the radially outer under surface portion 80 of the gasket 64 overhangs and is positioned radially outwardly of the end of horizontal leg 68 of the sealing ring. In the preliminarily seated position of the stopper, shown in FIGURE 1, the upper surface 78 of the gasket bears firmly against seat 60, as aforesaid, leg 68 of the sealing gasket 66 rests on seat 54 and the outer periphery 82 of the gasket lies immediately adjacent the wall portion 76 of the filler 14. In this position the gasket is not compressed except to the degree produced when groove 72 snaps over rib 74, and the overhanging portion 80 thereof is spaced slightly above the seat 54. As the stopper 18 is turned into fully seated position, the upper surface of the lower thread 58 on the stopper comes into bearing relation to the underside of the thread 56 in the neck 52 and pulls the stopper downwardly into the neck 52, further compressing the gasket 64 and bringing the overhanging portion 80 of the gasket into firm engagement with seat 54 and establishing a firm frictional bond between the gasket and the seat 54. This compression of the gasket also establishes a frictional bond between the periphery of the gasket and the wall portion 76.

The final threading movement into place of the stopper 18 also presses the under side of the horizontal leg 68 of the sealing ring 66 against the seat 54 and establishes an additional frictional bond therebetween. As previously noted, however, the coefficient of friction between the rubber gasket 62 and the co-engaged portions of the interior wall of the filler 14 is substantially greater than that between the sealing ring 66 and the filler 14. Consequently, in the fully seated position, a major portion of the frictional bond between the stopper 18 and the filler 14 is established by the gasket.

As previously mentioned the gasket 64 is preferably formed of quite soft and highly resilient rubber or rubber-like material. Consequently, as the stopper is threaded into place the consequent compression of the gasket 64 forces the surface thereof to conform to any irregularities and unevenness in the surface of the neck of the filler 14 occasioned by manufacturing tolerances commonly present in the manufacture of blown glass articles. Thus, with the parts in fully seated relation, the composite seal 62 forms a positive and effective seal between the filler 14 and the cover 18. In this position also, the sealing ring 66 positively prevents contact between the contents of the bottle and the gasket 64.

Under the previously mentioned above atmospheric pressure conditions which obtain when the filler contains hot liquid, the bond between the filler 14 and the gasket 64, aided to a minor extent by the bond between the sealing ring 62 and the filler 14, is sufficient to prevent the pressure acting on the stopper from unscrewing the stopper and the composite seal 62 from the filler. Similarly, the frictional bond between the gasket 64 and the stopper shoulder 60, aided by the bond between the sealing ring 66 and the wall portion 55, prevent relative rotation between the composite seal 62 and the stopper 18. Due to the larger surface areas involved, this latter bond is considerably greater than the bond between the seal 62 and the filler 14. Thus, under positive pressure conditions the stopper 18 is firmly and securely held in place without at the same time requiring that the stopper be turned so far into place in the neck as to load the threads 56–58 to an undesirable degree.

As previously mentioned, the partial vacuum conditions which obtain within the filler after the contents have cooled and particularly when the contents have to some substantial extent been removed, tend to deform the composite seal and suck the stopper downwardly through the filler neck. These forces are effectively resisted by the present composite seal without at the same time requiring the exertion of any substantial force when it is required to unscrew the stopper from the filler. More particularly, the horizontal leg 68 of the sealing ring 66, interposed as it is between the gasket 64 and the interior of the filler, effectively prevents the gasket from being deformed and sucked down into the annular space between the neck 52 and the wall 55 of the stopper. As aforesaid also, rib 74 and groove 72 coact to prevent any displacement of the ring 62 relative to the stopper. Thus, under the partial vacuum condition, the gasket 64 retains substantially the shape shown in FIGURE 2, and in order to unscrew the stopper it is only necessary to overcome the previously described frictional bond between the seal 62 and the filler 14. This bond, while adequate as previously described to prevent undesired unscrewing of the stopper under the positive pressure conditions, is not substantial enough to interfere with removal of the stopper by application of a moderate turning force, particularly when applied to the relatively large outer rim 84 of the stopper 18.

In the form shown in FIGURES 1–3 no provision is made to positively prevent relative rotation between the composite seal 62 and the stopper 18, the previously described frictional forces being relied upon. FIGURE 4 illustrates a modification of the invention in which the sealing ring instead of being L-shaped in channel shaped, so as to be reversible, and in which mechanical interlock is provided to inhibit rotation between the seal and the stopper.

As shown in FIGURE 4 the sealing ring 66' has the vertical leg 70' and two horizontally extending legs 68'. As before, to yieldingly and releasably hold the seal in place on the stopper, the ring 66' has an annular groove 72' to receive the previously described rib 74 on the stopper. In order to provide a positive lock which prevents relative rotation between the seal and the stopper, both upper and lower legs of the sealing ring have short radially extending grooves 86, which receive correspondingly positioned short ribs which may be formed on the under side of the previously described shoulder 60 of the stopper (not shown in FIGURE 4). These grooves 86 are shorter in length than the horizontal legs 68' and so do not interrupt the seal between the composite seal and the filler neck 52 when in place upon the latter. It will be understood that by having the grooves 86 in both the upper and lower legs of the sealing ring, the latter is reversible and may be fitted in place with either leg 68' uppermost.

Although only several specific embodiments of the invention have been described in detail it will be appreciated that various further modifications may be made, all within the spirit and scope of the invention as defined in the following claims. The present disclosure is therefore to be regarded in an illustrative and not in a limiting sense.

What is claimed is:

1. In combination, a container the interior whereof is subject to above-atmospheric and sub-atmospheric condition, said container having a filler opening provided with a seat, a closure for said opening threadably engaged in said opening, and a composite between the closure and the seat, said seal having a first portion of resilient material having a relatively high coefficient of friction and a second portion having a relatively low coefficient of friction, both said portions being disposed to bear against said seat when the closure is threaded into place in the opening, said first portion forming when said closure is in place a frictional bond with the seat which substantially resists unseating rotation of the closure under the influence of above-atmospheric pressure conditions within the container, and the second portion forming a relatively low friction rotative connection between the closure and the seat to facilitate unseating rotation of the closure by externally applied force when subatmospheric conditions exist within the container.

2. In combination, a container the interior whereof is subject to above-atmospheric and sub-atmospheric conditions, said container having a filler opening provided with an annular seat, a closure for said opening threadably engaged in said opening, and an annular composite seal interposed between the closure and the seat, said seal having a first annular portion of resilient material having a relatively high coefficient of friction and and a second annular portion having a relatively low coefficient of friction, both said portions being disposed to bear against said seat when the closure is threaded into place in the opening, said first portion forming when said closure is in place a frictional bond with the seat which substantially resists unseating rotation of the closure under the influence of above-atmospheric pressure conditions within the container and the second portion forming a relatively low friction rotative connection between the closure and the seat to facilitate unseating rotation of the closure by externally applied force when subatmospheric conditions exist within the container, said second annular portion engaging said seat over an area which lies between the interior of the container and the part of the seat engaged by the first portion.

3. In combination, a container the interior whereof is subject to above-atmospheric and sub-atmospheric conditions, said container having a filler opening provided with an annular seat, a closure for said opening threadably engaged in said opening, and an annular composite seal interposed between the closure and the seat, said having a first radially outer annular portion of resilient material having a relatively high coefficient of friction and a second radially inner annular portion having a relatively low coefficient of friction, both said portions being disposed to bear against said seat when the closure is threaded into place in the opening, said first portion forming when said closure is in place a frictional bond with the seat which substantially resists unseating rotation of the closure under the influence of above-atmospheric pressure conditions within the container and the second portion forming a relatively low friction rotative connection between the closure and the seat to facilitate unseating rotation of the closure by externally applied force when sub-atmospheric conditions exist within the container, said second annular portion engaging said seat over an area which lies between the interior of the container and the part of the seat engaged by the first portion.

4. The combination with the filler of a vacuum bottle having a threaded necked opening provided with a seat and a threaded stopper provided with a shoulder, of a composite sealing member surrounding said stopper in engagement with said shoulder and adapted to engage said seat when the stopper is in operative position, said sealing member comprising a gasket formed of rubber-like material, and a sealing ring formed of flexible low-friction material partially enclosing said gasket, said sealing ring having a portion adapted to engage said seat when the stopper is in operative position and said gasket having a portion not enclosed by said ring and disposed to bear against said seat and establish a substantial frictional bond therewith.

5. The combination with the filler of a vacuum bottle having a threaded necked opening provided with a seat and a threaded stopper provided with a shoulder, of a composite sealing member surrounding said stopper in engagement with said shoulder and adapted to engage said seat when the stopper is in operative position, said sealing member comprising a gasket formed of rubber-like material, and a sealing ring formed of flexible low-friction material partially enclosing said gasket, said sealing ring having a portion adapted to engage said seat when the stopper is in operative position and a portion interlocked with said stopper to inhibit relative movement between said stopper and said ring, and said gasket having a portion not enclosed by said ring and disposed to bear against said seat and establish a substantial frictional bond therewith.

6. The combination with the filler of a vacuum bottle having a threaded necked opening provided with a seat and a threaded stopper provided with a shoulder, of a composite sealing member surrounding said stopper in engagement with said shoulder and adapted to engage said seat when the stopper is in operative position, said sealing member comprising a gasket formed of rubber-like material, and a sealing ring formed of flexible low-friction material partially enclosing said gasket, said sealing ring having a portion adapted to engage said seat when the stopper is in operative position and said gasket having a portion not enclosed by said ring and disposed to bear against said seat and establish a substantial frictional bond therewith, the area of said seat engaged by said sealing ring lying between the interior of the bottle and the part of said seat engaged by the gasket.

7. In a closure for a container the interior whereof is subject to above-atmospheric and sub-atmospheric conditions, said container having a filler opening provided with a seat and the closure being a member threadably engaged in said opening, that improvement which consists of a composite seal carried by the closure and disposed to engage the seat when the closure is in place, said seal having a first annular portion of resilient material having a relatively high coefficient of friction and a second annular portion having a relatively low coefficient of friction, both said portions being disposed to bear against said seat when the closure is threaded into place in the opening, said first portion forming when said closure is in place a frictional bond with the seat which substantially resists unseating rotation of the closure under the influence of above-atmospheric pressure conditions within the container and the second portion forming a relatively low friction rotative connection between the closure and the seat to facilitate unseating rotation of the closure by externally applied force when sub-atmospheric conditions exist within the container, said second annular portion engaging said seat over an area which lies between the interior of the container and the part of the seat engaged by the first portion.

8. In a closure for a vacuum bottle having a threaded necked opening provided with a seat and a threaded stopper provided with a shoulder, that improvement which consists of a composite sealing member surrounding said stopper in engagement with said shoulder and adapted to engage said seat when the stopper is in operative position, said sealing member comprising a gasket formed of rubber-like material, and a sealing ring formed of flexible low-friction material partially enclosing said gasket, said sealing ring having a portion adapted to engage said seat when the stopper is in operative position and said gasket having a portion not enclosed by said ring and disposed to bear against said seat and establish a substantial frictional bond therewith, the area of said seat engaged by said sealing ring lying between the interior of the bottle and the part of said seat engaged by the gasket.

9. In a composite seal for association with the threaded stopper of a vacuum bottle or the like and adapted to engage a seat provided in the bottle, an annular casing member formed of flexible material having a relatively low coefficient of friction, said casing member being L-shaped in cross section with the vertical leg of the L embracing the body of the stopper and with the horizontal leg of the L extending radially outwardly of the vertical leg and disposed to rest upon the seat in the bottle, and a gasket of highly resilient rubber-like material seated on the sealing ring and having a portion extending radially beyond the end of the horizontal leg of the L, said outwardly extending portion of the gasket being adapted to engage the seat in the bottle and form a seal therewith.

10. In a composite seal for association with the threaded stopper of a vacuum bottle or the like, said stopper having a shoulder and said bottle having a seat, an annular casing member formed of flexible material having a relatively low coefficient of friction, said casing member being channel shaped in annular cross section with the base of the channel embracing the body of the stopper and with the flanges of the channel extending radially outwardly of the vertical leg and disposed to rest respectively against the shoulder on the stopper and upon the seat in the bottle, and a gasket of highly resilient rubber-like material seated on the sealing ring and having a portion extending radially beyond the ends of the flanges of the channel, said outwardly extending portion of the gasket being adapted to engage the seat in the bottle and form a seal therewith.

11. In a composite seal for association with the threaded stopper of a vacuum bottle or the like and adapted to engage a seat provided in the bottle, an annular casing member formed of flexible material having a relatively low coefficient of friction, said casing member being L-shaped in cross section with the vertical leg of the L embracing the body of the stopper and with the horizontal leg of the L extending radially outwardly of the vertical leg and disposed to rest upon the seat in the bottle, and a gasket of highly resilient rubber-like material seated on the sealing ring and having a portion extending radially beyond the end of the horizontal leg of the L, said outwardly extending portion of the gasket being adapted to engage the seat in the bottle and form a seal therewith, said stopper and casing member having interlocking portions which inhibit relative movement between said stopper and casing member and hold said casing member in place upon said stopper.

12. In a composite seal for association with the threaded stopper of a vacuum bottle or the like, said stopper having a shoulder and said bottle having a seat, an annular casing member formed of flexible material having a relatively low coefficient of friction, said casing member being channel shaped in annular cross section with the base of the channel embracing the body of the stopper and with the flanges of the channel extending radially outwardly of the vertical leg and disposed to rest respectively against the shoulder on the stopper and upon the seat in the bottle, and a gasket of highly resilient rubber-like material seated on the sealing ring and having a portion extending radially beyond the ends of the flanges of the channel, said outwardly extending portion of the gasket being adapted to engage the seat in the bottle and form a seal therewith, said stopper and casing member having interlocking portions which inhibit relative movement between said stopper and casing member and hold said casing member in place upon said stopper.

13. In a composite seal for association with the threaded stopper of a vacuum bottle or the like, said stopper having a shoulder and said bottle having a seat, an annular casing member formed of flexible material having a relatively low coefficient of friction, said casing member being channel shaped in annular cross section with the base of the channel embracing the body of the stopper and with the flanges of the channel extending radially outwardly of the vertical leg and disposed to rest respectively against the shoulder on the stopper and upon the seat in the bottle, and a gasket of highly resilient rubber-like material seated on the sealing ring and having a portion extending radially beyond the ends of the flanges of the channel, said outwardly extending portion of the gasket being adapted to engage the seat in the bottle and form a seal therewith, said casing member being reversely positionable upon said stopper.

14. In a composite seal for association with the threaded stopper of a vacuum bottle or the like, said stopper having a shoulder and said bottle having a seat, an annular casing member formed of flexible material having a relatively low coefficient of friction, said casing member being channel shaped in annular cross section with the base of the channel embracing the body of the stopper and with the flanges of the channel extending radially outwardly of the vertical leg and disposed to rest respectively against the shoulder on the stopper and upon the seat in the bottle, and a gasket of highly resilient rubber-like material seated on the sealing ring and having a portion extending radially beyond the ends of the flanges of the channel, said outwardly extending portion of the gasket being adapted to engage the seat in the bottle and form a seal therewith, said casing member being reversely positionable upon said stopper and said stopper and casing member having interlocking portions which inhibit relative movement between said stopper and casing member and hold said casing member in place upon said stopper.

15. In a vacuum bottle having an access opening in the form of an outer annular rim and an inner annular throat of reduced diameter with an annular substantially radially inwardly extending seat located therebetween, stopper means for closing said access opening having a throat portion engageable with the inner annular throat of the vacuum bottle and a cylindrical portion extending above the throat portion and spaced inwardly of the wall of the access opening and a substantially radially outwardly extending seat adapted to be spaced above said radially inwardly extending seat, sealing means located between said vacuum bottle and said stopper means and comprising a first ring of relatively soft highly resilient rubber-like material, portions of said first ring being compressibly engageable with portions of the radially inwardly extending seat, and a second ring of flexible relatively hard material having a low coefficient of friction partially surrounding said first ring and having portions extending from the cylindrical portion of the stopper means radially outwardly beyond the inner edge of the radially inwardly extending seat, portions of said second ring being engageable with the radially inwardly extending seat between said first ring and the inner annular throat, the location of said first ring being confined by said second ring to positions located outwardly of said radially inwardly extending seat.

16. The invention as defined in claim 15 and said second ring being attached to the cylindrical portion of the stopper means and supporting said first ring on said radially outwardly extending seat on the stopper means.

17. The invention as defined in claim 15 and wherein the outer end portions of said second ring terminate short of both of the seats, and portions of the first ring extending beyond the end portions of the said second ring.

18. The invention as defined in claim 15 and wherein said second ring has a L-shaped cross sectional configuration.

19. The invention as defined in claim 15 and wherein said second ring has a U-shaped cross sectional configuration.

20. The invention as defined in claim 15 and wherein said second ring is provided with an inwardly facing annular groove, and said cylindrical portion of the stopper means having an outwardly facing annular rim adapted to be lockingly received in said groove.

21. The invention as defined in claim 20 and wherein said second ring is further provided with notch means and said stopper means is provided with lock means to lockingly receive said notch means.

22. The invention as defined in claim 15 and said vacuum bottle having an outwardly tapered surface extending between the outer annular rim and the radially inwardly extending seat, the radial length of the radially outwardly extending seat being substantially less than the radial distance to said tapered surface so as to leave a substantial gap therebetween for radial outward expansion for said first ring during compression between the seats.

23. Sealing means for closing a gap between relatively movable parts having spaced substantially parallel surfaces when sealed, said surfaces being relatively movable at least partially in parallel planes during association and disassociation of said parts in a sealed condition, said sealing means being mounted between said surfaces, a first portion of said sealing means being made of a relatively soft highly resilient rubber-like material capable of being compressed between said surfaces to form a seal therebetween during relative movement between said parts to the sealed condition, and a second portion of said sealing means being made of a flexible relatively hard material having a low coefficient of friction adapted to have sliding engagement on one of said surfaces between said first portion of said sealing means and said one of said surfaces during relative movement of the parts to the sealed condition and to prevent displacement of said first portion of said sealing means past said one of said surfaces away from the other of said surfaces beneath said second portion of said sealing means in the sealed condition.

References Cited in the file of this patent

UNITED STATES PATENTS

| 2,941,824 | Hoyer | June 21, 1960 |
| 3,017,047 | Payson et al. | Jan. 16, 1962 |

FOREIGN PATENTS

| 770,048 | Great Britain | Mar. 13, 1957 |
| 1,103,787 | France | June 1, 1955 |

UNITED STATES PATENT OFFICE
CERTIFICATE OF CORRECTION

Patent No. 3,144,153                      August 11, 1964

George W. Fuller et al.

It is hereby certified that error appears in the above numbered patent requiring correction and that the said Letters Patent should read as corrected below.

Column 1, line 24, before "relatively" insert -- a --; line 65, after "and", first occurrence, insert -- the --; column 2, line 61, after "casing" insert -- 10 --; column 3, line 56, for "88" read -- 68 --; column 5, line 29, for "in" read -- is --; line 64, after "composite" insert -- seal interposed --; column 6, line 11, strike out "and", first occurrence; line 32, after "said" insert -- seal --.

Signed and sealed this 21st day of September 1965.

(SEAL)
Attest:

ERNEST W. SWIDER
Attesting Officer

EDWARD J. BRENNER
Commissioner of Patents